US008312546B2

(12) United States Patent
Alme

(10) Patent No.: US 8,312,546 B2
(45) Date of Patent: Nov. 13, 2012

(54) SYSTEMS, APPARATUS, AND METHODS FOR DETECTING MALWARE

(75) Inventor: Christoph Alme, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 988 days.

(21) Appl. No.: 11/738,882

(22) Filed: Apr. 23, 2007

(65) Prior Publication Data

US 2008/0263669 A1    Oct. 23, 2008

(51) Int. Cl.
G06F 11/00   (2006.01)
G06F 12/14   (2006.01)
G06F 12/16   (2006.01)
G08B 23/00   (2006.01)

(52) U.S. Cl. ............. 726/24; 726/22; 726/23; 713/164; 713/165; 713/176

(58) Field of Classification Search ............. 726/22–24; 713/164–167, 176; 707/780
See application file for complete search history.

(56) References Cited

U.S. PATENT DOCUMENTS

| 5,440,723 | A | 8/1995 | Arnold et al. | |
|---|---|---|---|---|
| 7,620,991 | B2 * | 11/2009 | Taneja et al. | 726/24 |
| 7,716,297 | B1 * | 5/2010 | Wittel et al. | 709/206 |
| 2005/0060643 | A1 | 3/2005 | Glass et al. | |
| 2006/0015630 | A1 * | 1/2006 | Stolfo et al. | 709/230 |
| 2007/0152854 | A1 * | 7/2007 | Copley | 341/51 |

OTHER PUBLICATIONS

"European Application Serial No. 08155001.4, Extended European Search Report mailed Jul. 25, 2008", 7 pgs.
Goel, S., et al., "Kolmogorov Complexity Estimates for Detection of Viruses in Biologically inspired Security Systems: A comparison with Traditional Approaches", *Resilent and Adaptive Defense of Computing Networks*, 9, (2004), 54-73.
European Application No. 08155001.4, Communication Pursuant to Article 94(3) EPC mailed May 26, 2009, 1 pg.
"European Application Serial No. 08155001.4, Office Action mailed May 26, 2009", 1 pg.
"European Application Serial No. 08155001.4, Office Action mailed Dec. 14, 2010", 4 pgs.
"European Application Serial No. 08155001.4, Response filed Dec. 4, 2009, to Office Action mailed Jul. 25, 2008", 5 pgs.
"European Application Serial No. 08155001.4, Office Action Response Filed Jun. 14, 2011", 14 pgs.

* cited by examiner

*Primary Examiner* — Jeffrey D Popham
*Assistant Examiner* — Daniel Potratz
(74) *Attorney, Agent, or Firm* — Wong, Cabello, Lutsch, Rutherford & Brucculeri, LLP

(57) ABSTRACT

Various embodiments, including a method comprising creating a first fuzzy fingerprint of a known malware file, the first fuzzy fingerprint including a first set of calculated complexity approximations and weightings for each of a plurality of blocks within the known malware file, creating a second fuzzy fingerprint of a file to be checked, the second fuzzy fingerprint including a second set of calculated complexity approximations and weightings for each of a plurality of blocks within the file to be checked, comparing the second fuzzy fingerprint to the first fuzzy fingerprint, calculating a similarity probability for each of the block-wise comparisons, the calculation including a respective weightings for each of the plurality of blocks within the known malware file and for each of the plurality of blocks within the file to be checked, and the calculation including a distance between the compared blocks; and calculating an overall similarity probability for the plurality of blocks compared.

21 Claims, 9 Drawing Sheets

|   | 721 | 722 | 723 | 724 | 725 | 726 | 727 | 728 | 729 | 730 |
|---|---|---|---|---|---|---|---|---|---|---|
| | 3.31 | 2.12 | 0.00 | 0.00 | 0.00 | 0.00 | 0.00 | 0.00 | 0.00 | 0.00 |
| | 1.51 | 4.09 | 4.29 | 4.35 | 4.39 | 4.26 | 4.26 | 4.45 | 4.31 | 4.26 |
| | 4.22 | 3.94 | 4.21 | 4.24 | 4.40 | 4.40 | 4.33 | 4.30 | 3.98 | 4.39 |
| | 4.52 | 4.51 | 4.41 | 4.33 | 4.35 | 4.35 | 4.25 | 4.36 | 4.45 | 4.39 |
| | 4.38 | 4.42 | 4.32 | 4.31 | 4.26 | 4.23 | 4.35 | 4.41 | 4.34 | 4.32 |
| | 4.28 | 4.40 | 4.40 | 4.36 | 4.32 | 4.45 | 4.51 | 4.44 | 4.34 | 4.48 |
| | 4.20 | 4.42 | 4.27 | 4.16 | 4.22 | 3.94 | 4.09 | 4.34 | 4.36 | 4.35 |
| | 4.24 | 4.27 | 4.16 | 4.00 | 3.97 | 4.15 | 4.30 | 4.29 | 4.25 | 4.50 |
| | 4.43 | 4.34 | 4.30 | 4.36 | 4.27 | 4.26 | 4.34 | 4.13 | 4.12 | 4.30 |
| | 4.31 | 4.12 | 3.19 | 2.95 | 1.22 | 2.95 | 0.44 | 2.67 | 2.35 | 2.28 |
| | 2.34 | 2.41 | 2.43 | 2.25 | 2.37 | 2.42 | 2.38 | 2.41 | 2.33 | 2.33 |
| | 2.42 | 2.38 | 2.42 | 2.36 | 2.38 | 2.43 | 2.34 | 2.37 | 2.37 | 2.22 |
| | 2.43 | 2.35 | 2.35 | 2.35 | 2.37 | 2.36 | 2.31 | 2.36 | 2.36 | 2.41 |
| | 2.39 | 2.37 | 2.34 | 2.35 | 2.28 | 2.34 | 2.37 | 2.36 | 2.34 | 2.35 |
| | 2.36 | 2.34 | 2.35 | 2.34 | 2.38 | 2.31 | 2.37 | 2.47 | 2.40 | 2.34 |
| | 2.99 | 4.62 | 2.54 | | | | | | | |

Fig. 7

SYSTEMS, APPARATUS, AND METHODS FOR DETECTING MALWARE

FIELD OF THE INVENTION

The present invention is related to computer network security, and more particularly, to a system and method for detecting possible malware.

BACKGROUND INFORMATION

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware"). The term malware as used herein includes any type of software programs designed to infiltrate or damage a computer system without the owner's informed consent, regardless of the motivation for the software program, and regardless of the results caused by the software program on the owner's devices, systems, networks, or data.

Such programs, when installed on the user's computer, can eavesdrop on the user, collect sensitive information and, in some cases, take control of the user's computer. In some cases, these software programs send messages out to other computers or servers, providing a conduit for the transfer of potentially sensitive information.

Various detection programs may be used to attempt to detect the presence of malware. In some instances, the detection programs rely on detecting a signature in a software program being examined to determine if the program is or contains, malware. In some instances, a detection program uses a checksum based method to determine whether a software program is malware. However, malware authors frequently change parts of the malware programs in order to avoid detection by signature or checksum methods. New variants of known malware may be created by re-packing or compiling within short time intervals in order to evade signature or checksum based detection and to take advantage of the delay in creating and distributing updated detection signatures or checksums.

Vendors of detection software try to counteract the increased amount of new malware variants and samples by using more generic detections, and more heuristic detections. However, generic detections bear the deficiency of requiring manual analysis of one, in most cases at least two malware variant(s) in order to provide an appropriate detection. Further, heuristic detections bear the deficiency of false positives.

BRIEF DESCRIPTION OF THE DRAWINGS

FIG. 6 illustrates a diagram including a representation of blocks and their complexity values of a first file and a representation of blocks and their complexity values of a second file;

FIG. 7 illustrates diagram including a representation of blocks and their complexity values of a file;

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
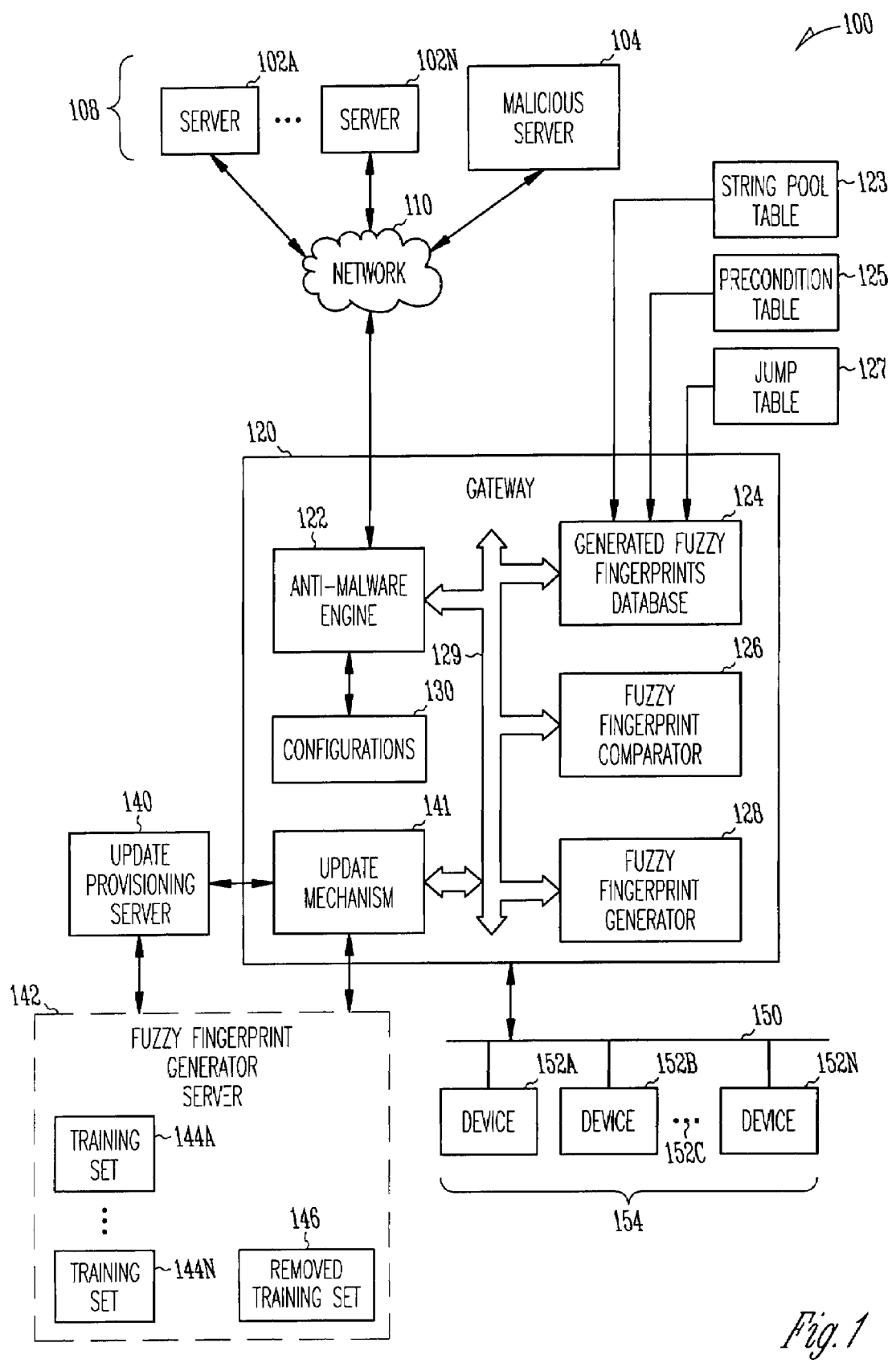
FIG. 1 illustrates a system including a gateway.

FIG. 1 illustrates a system 100 including a gateway 120. Gateway 120 couples a plurality of protected devices 154 to network 110. Protected devices 154 are not limited to any number or types of devices, and may include any devices, such as but not limited to computers, servers, and databases that are coupled to an external network 110 through gateway 110. Devices 152A and 152B through 152N represent any number of devices, as illustrated by dotted line 152C, that are coupled to and protected by gateway 120. In various embodiments, devices 152A and 152B through 152N may be coupled by one or more networks 150, which also couples devices 152A and 152B through 152N to gateway 120.

Devices 152A and 152B through 152N are referred to as being "protected" because these devices are the devices configured to receive the anti-malware protection provided by gateway 120. In various embodiments, devices 152A and 152B through 152N are coupled through gateway 120 to network 110, and to one or more devices 108 coupled to network 110. Network 110 is not limited to a particular type or number of networks. In various embodiments, network 110 includes the Internet. Devices 108 are not limited to any particular type or number of devices, and in various embodiments include illustrative servers 102A-102N. Servers 102A-102N may provide one or more resources, such as files or web pages, that may be requested by protected devices 152A and 152B through 152N. Because these requests are coupled through gateway 120, gateway 120 is operable to scan the communications passing through gateway 120, and to detect and block malware in the communications going to, or coming from, the protected devices 152A and 152B through 152N.

Gateway 120 is not limited to only one physical or logical device; for example, it can consist of a cluster of gateway devices, or communications between protected devices and the network can be handled primarily by one logical group of gateway devices, while the anti-malware protection of the content being handled is off-loaded to another group of gateway devices.

In various embodiments, gateway 120 is operable to intercept communications between any of protected devices 152A and 152B through 152N, and to detect and block malware in these communications. In various embodiments, gateway 120 may poll any of protected devices 152A and 152B through 152N to determine if the polled device is contaminated with malware.

In various embodiments, gateway 120 includes an anti-malware engine 122. In various embodiments, gateway 120 includes a generated fuzzy fingerprint database 124, a fuzzy fingerprint comparator 126, and a fuzzy fingerprint generator 128. Database 124, comparator 126, and generator 128 are part of, and logically coupled to, anti-malware engine 122. In various embodiments, database 124 is operable to store a set of fuzzy executable fingerprints. The fuzzy executable fingerprints stored in database 124 include fuzzy executable fingerprints generated from files known to be malware. Generation of fuzzy executable fingerprints is not limited to any particular means, and may include manually generating a fuzzy executable fingerprint, or automatically generating a fuzzy executable fingerprint by determining that an executable is malware based on comparison to other fuzzy executable fingerprints.

In various embodiments, generator 128 is operable to generate a fuzzy executable fingerprint for a file. In various embodiments, generator 128 generates the fuzzy executable fingerprint for a file received at gateway 120 and for which a comparison is to be performed to determine if the received file is malware. Comparator 126 is operable to compare fuzzy exactable fingerprints provided by generator 128 and compare the generated fuzzy executable fingerprint to one or more of the fuzzy executable fingerprints stored in database 124.

In various embodiments, anti-malware engine 122 controls the operations of database 124, comparator 126, and generator 128. In various embodiments, configurations 130 includes configuration settings and stored values used by anti-malware engine 122 to control the malware detention processes. In various embodiments, configurations 130 store one or more threshold values used in the malware detection processes, as further described herein.

In various embodiments, all or parts of the implementation of generator 128 and comparator 126 may be stored within database 124, using a script- or P-code language. In various embodiments, gateway 120 is coupled to fuzzy fingerprint generator server 142 through update provisioning server 140. In various embodiments, server 142 includes one or more stored training sets 144A-144N. Training sets 144A-144N include one or more stored files that are known to include malware. From training sets 144A-144N, server 142 is operable to generate fuzzy executable fingerprints for any of the files included in training sets 144A-144N. Update provisioning server 140 is operable to, at certain intervals or as new variants of malware are discovered, update with new fuzzy executable fingerprints the database 124 in gateway 120. In various embodiments, update mechanism 141 controls the updating of database 124 with new fuzzy executable fingerprints from server 140.

In various embodiments, server 142 includes removed training set 146. In various embodiment, server 142 includes a plurality of removed training sets represented by training set 146. In various embodiments, removed training set 146 includes one or more files that are removed as being fingerprints that generate false-positives. In various embodiments, removed training set 146 is generated automatically when a false positive had been generated from the training sets.

In various embodiments, anti-malware engine 122 will determine that it has discovered a new variant of malware. In various instances, a file from one of protected devices 152A, 152B-15N or over network 110, for instance from malicious server 104, will be processed by the anti-malware engine and determined to include, or be, malware. In various instances, a fuzzy executable fingerprint will have been generated for the detected malware file, and may be added to database 124. In various embodiments, the newly discovered malware file will be provided to server 142 so that this malware file can be added to the training sets stored at server 142.

In various embodiments, newly discovered malware files provided by gateway 120 will become available for other anti-malware detection systems (not shown in FIG. 1) outside system 100. In various embodiments, anti-malware detection systems outside system 100 will provide the newly discovered malware files to server 142. Server 142 may generate fuzzy executable fingerprints for these outside provided malware files, and update database 124 to include fuzzy executable fingerprints for these outside discovered malware file.

In this way, system 100 is operable to automatically update its own database 124 as new malware files are discovered at gateway 120, and is operable to provide newly discovered malware files to other anti-malware detection systems. In addition, system 100 can be automatically updated with fuzzy executable fingerprints for malware files newly discovered outside system 100, even if the newly discovered files were not detected using a comparison of fuzzy executable fingerprints. In instances where the newly discovered malware does not already have a fuzzy executable fingerprint generated for the file, server 142 or generator 128 maybe used to generate the fuzzy executable fingerprint for the file.

In various embodiments, database 124 may include one or more tables. In various embodiments, database 124 includes precondition table 125. In various embodiments, database 124 includes jump table 127. Precondition table 125 and jump table 127 provide mechanism to speed up the searching of the stored fuzzy executable fingerprints in database 124.

In various embodiments, database 124 includes string pool table 123, providing a mechanism to unify redundant string portions in the malware names attached to the fingerprints, in order to reduce memory footprint.

In various embodiments, the fuzzy executable fingerprints stored in database 124 each include meta information, like the file's size and media type, a malware name to be assigned on match, and a set of entities reflecting a complexity approximation and weighting for blocks of data and code included in the file. The fuzzy executable fingerprints may be sorted by this information, such as file size or media type. The fuzzy executable fingerprints may be normalized, that is, very similar fuzzy executable fingerprints are stored as one merged fingerprint. Furthermore, a limited number of blocks may be merged to reduce memory footprint, given they are of low to medium weighting and of similar complexity; "merged" means to replace the blocks by one that covers the length of all that blocks together, with its complexity being that of the new, larger block.

A sort order of the fuzzy executable fingerprints is backed by precondition table 125 and a jump table 127, in order to collaboratively improve memory locality of prospective fuzzy executable fingerprints, and to reduce page faults by supporting the operating system to better swap out unused pages of the database (those relating to very small or very large files, like downloader stubs and installer packages, respectively).

In various embodiments, comparisons of a file against the database 124 first needs to evaluate the precondition table 125, in order to find out whether a lookup into the database 124 is required at all. For example, precondition table 125 contains magic bytes signatures for all media types covered by the database 124—comparing a GIF or JPEG image against a database containing only fuzzy executable fingerprints for PE files does not need any further lookup, as no match will ever be possible.

In various embodiments after passing the Precondition table 125, the comparison uses the jump table 127 to determine the relative offset of the first fuzzy executable fingerprint that has a chance to match the inquired file, at least by its file size. From there on, subsequent fuzzy executable fingerprints are iterated and compared until they leave the scope of possible match candidates for the compared file.

Upon match of a fingerprint, its associated malware name is expanded using string pool table 123. By way of illustration, the string pool table may contain entries such as "Win32." at index 0 in the table, "Trojan." at index 1, "Downloader." at index 2, through to ".gen" at index 7. Rather than storing lengthy malware names like "Trojan.Downloader.Win32.Agent.XY" or "Trojan.Win32.RBot.gen" associated with a plurality of fingerprints, the malware names would rather be stored as "\1\2\0Agent.XY" and "\1\0RBot\7", respectively (using "\" as an example escape character here, followed by the index into the string pool table).

Files with a high complexity (like compressed or runtime-packed executables) are likely to be too common in their layout to distinguish a benign- from a malicious compressed or runtime-packed file. The Kolmogorov complexity, e.g. the length of the shortest program representation (d) of a set (s), is used to sort out inappropriate candidates according to a definable threshold, for example $$\frac{|d(s)|}{|s|} \geq 0.94$$

An actual implementation will approximate the Kolmogorov complexity by, for example, using a good compression algorithm. In various embodiments, gateway 120 is operable to log and report any detected and any blocked malware.

Figure 2:
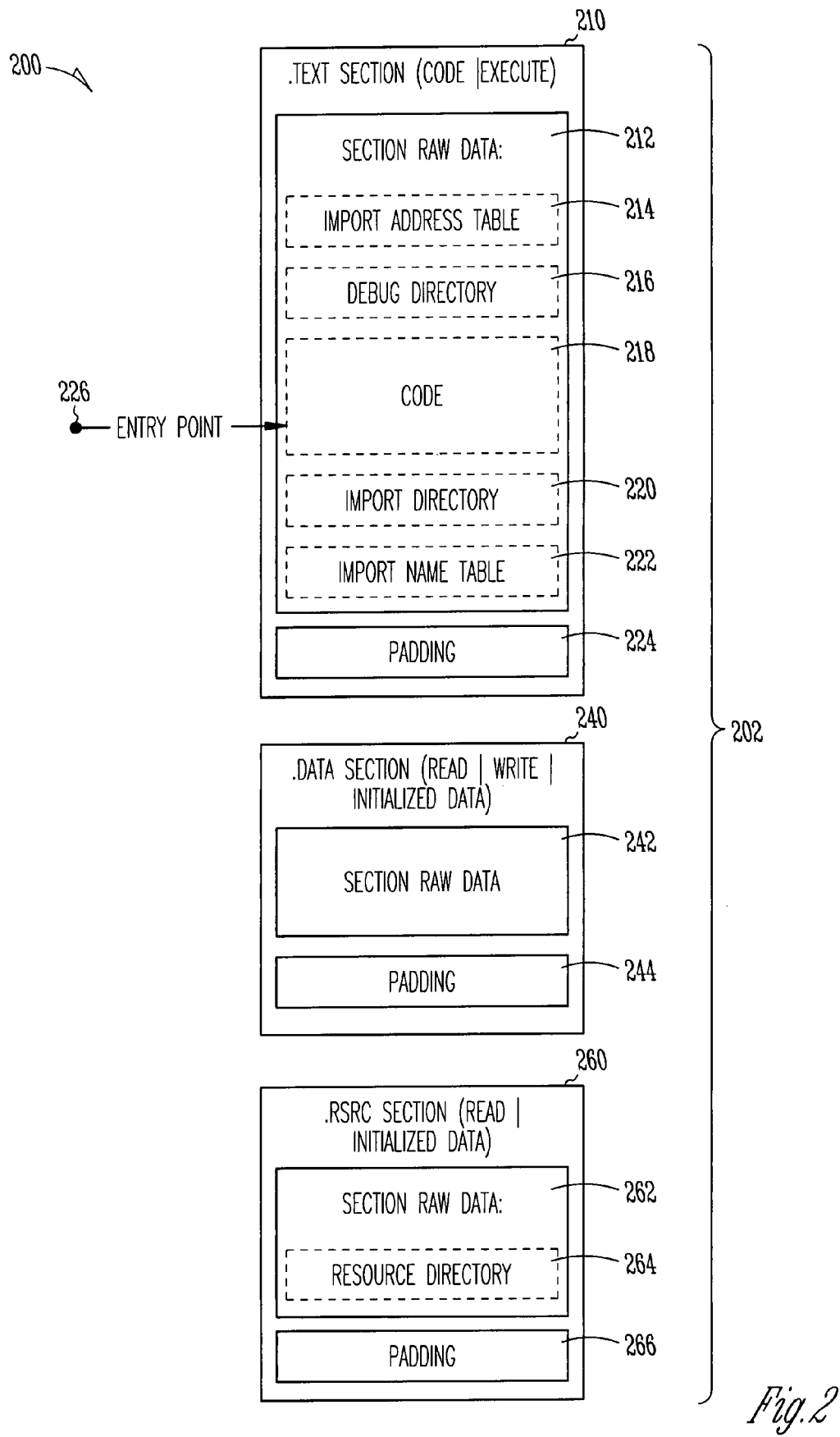
FIG. 2 illustrates a diagram of one possible layout for a executable file.

FIG. 2 illustrates a diagram 200 of one possible layout for a executable file 202. In various embodiments, executable file is a file that includes, or is, malware. In various embodiments, executable file 202 is a file that will have a fuzzy executable fingerprint generated for the file so that the fuzzy executable fingerprint for file 202 can be compared to fuzzy executable fingerprints for files known to include, or are, malware.

In various embodiments, file 202 include code section 210, data section 240, and a resource section 260. In various embodiments, section 210 includes import address table 214, debug directory 216, machine code 218, import directory 220, import name table 222, and padding 224. In various embodiments, data section 240 includes initialized data 242 and padding 244. In various embodiments, resource section 260 includes resource directory 264 and padding 266.

In various embodiments, depending on the generating compiler and linker, the complexity level varies throughout the different portions of file 202. Padding 224, 244, and 266 are typically areas of very low information entropy, as further described herein and as used as a measure of the complexity of the section. Import name table 222 and resource directory 264 are generally areas of low or medium information entropy.

Machine code 218 is generally a area of medium information entropy. In addition, machine code 218 is a likely point in file 202 to include programming causing file 202 to be malware. In various embodiments, entry point 226 may be chosen in code 218 for a starting point for comparing blocks used in the fuzzy executable fingerprint for file 202, as further described herein, and for files being compared to file 202 using a comparison between a fuzzy executable fingerprint for file 202 and a fuzzy executable fingerprint for the compared file.

Figure 3:
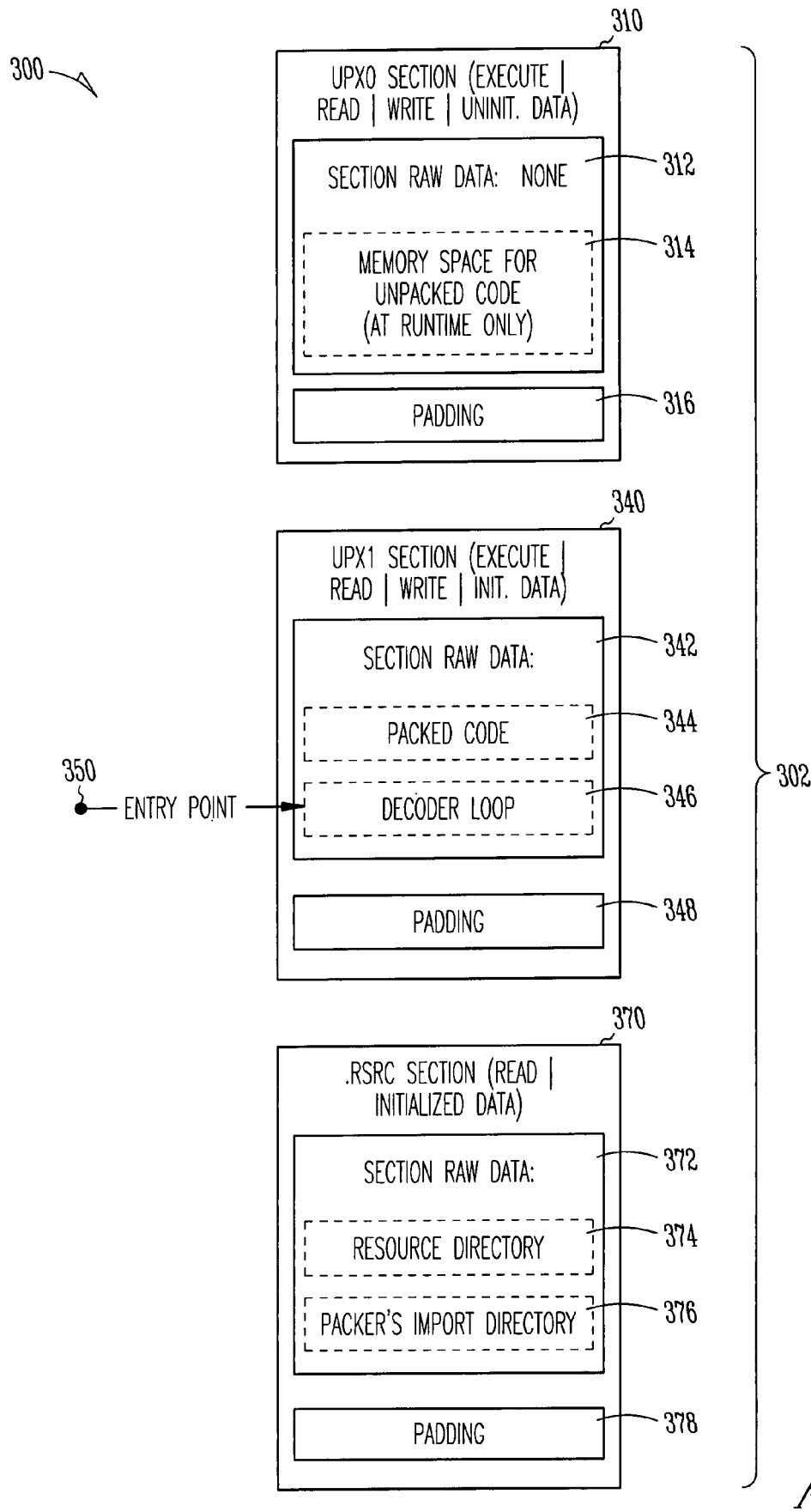
FIG. 3 illustrates a diagram of one possible layout for a runtime packed executable file.

FIG. 3 illustrates a diagram 300 of one possible layout for a runtime packed executable file 302, taking a packer called "UPX" as example. In various embodiments, file 302 is a file that includes malware. In various embodiments, file 302 is a file that will have a fuzzy executable fingerprint generated for the file so that the fuzzy executable fingerprint for file 302 can be compared to fuzzy executable fingerprints for files known to include malware.

In various embodiments, file 302 includes UPX0 section 310, UPX1 section 340, and a resource section 370. In various embodiments, UPX0 section 310 includes no raw data 312, rather denotes required memory space 314 for unpacked code, and padding 316. In various embodiments, UPX1 section 340 includes packed code 344, decoder loop 346, and padding 348. In various embodiments, resource section 370 includes section raw data 372, resource directory 374, packer's import directory 376, and padding 378.

In various embodiments, the complexity level varies throughout the different portions of file 302. Padding 316, 348, and 378 are typically areas of very low information entropy. Packed code 344 is generally an area of high information entropy. The data in packed code 344 is packed executable code, however, this is well detectable, may be unpacked by an anti-malware engine, and an increasing amount of malware programs are not packed, and detection can focus on non-packed executables. In various embodiments, entry point 350 in decoder loop, which is not runtime packed, is used for a starting point for comparing blocks used in the fuzzy executable fingerprint for file 302, as further described herein, and for files being compared to file 302 using a comparison between a fuzzy executable fingerprint for file 202 and a fuzzy executable fingerprint for the compared file.

Figure 4:
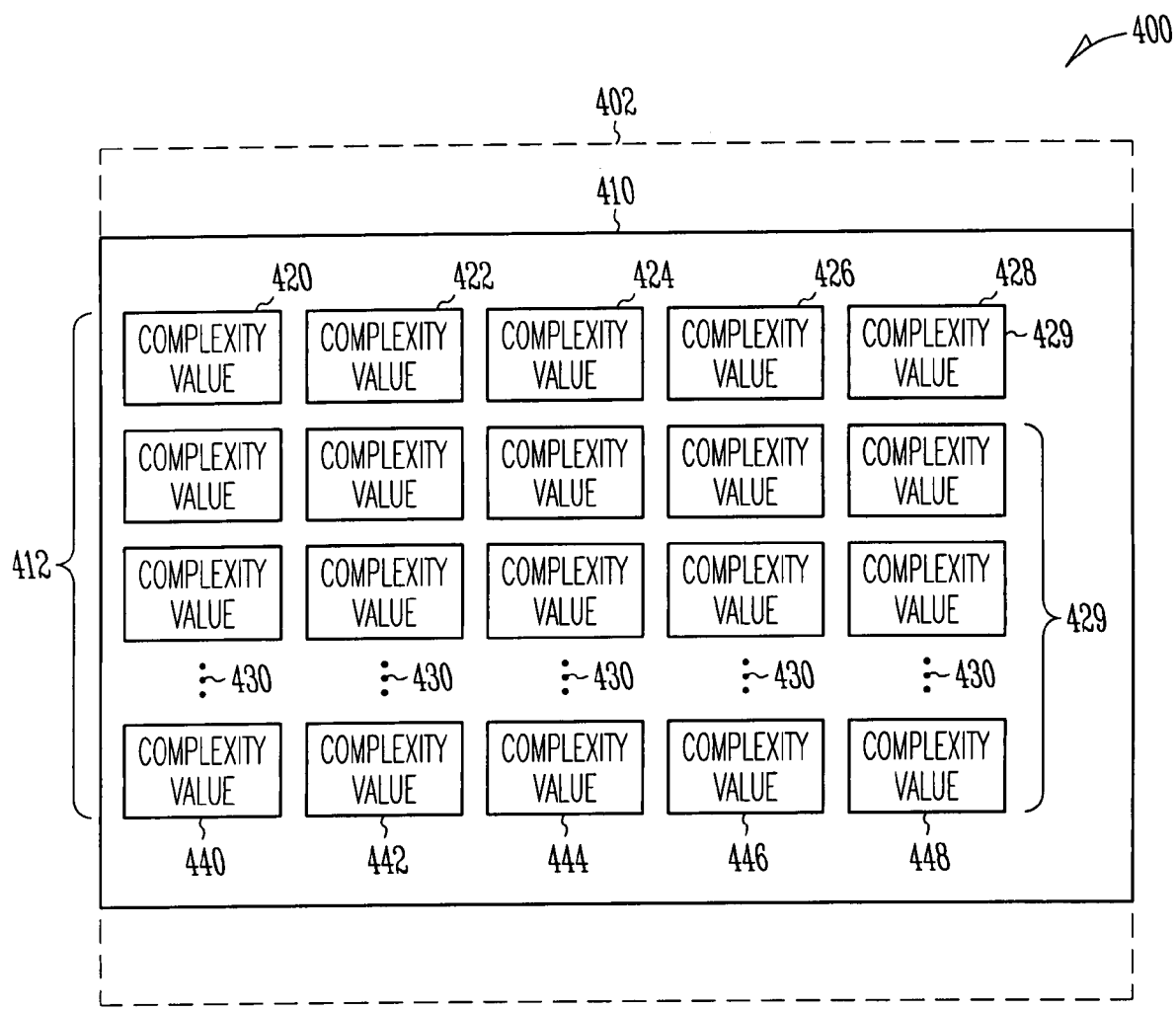
FIG. 4 illustrates a diagram of a file including a portion 410 of file 402 that has been divided into a plurality of blocks.

FIG. 4 illustrates a diagram 400 of a file 402 including a portion 410 of file 402 that has been divided into a plurality of blocks 412. In various embodiments, the plurality of blocks 412 may include a plurality of rows of blocks, such as blocks 420, 422, 424, 426, and 428 in a first row, and a plurality of additional rows 429, including a last row including blocks 440, 442, 444, 446, and 448. The number of block in a row is not limited to any particular number of blocks and may be more or less blocks than illustrated in FIG. 4. The number of rows in the portion of file 410 is not limited to any particular number, and may include any number of rows as illustrated by dotted lines 430 in FIG. 4.

As shown in diagram 400, illustrative portion of file 410 may be only a portion of a file that has been selected from an entire file based on a portion of the entire file that is most favourable for use in detecting malware. As one such example implementation, a block may be flagged, or its weighting be set to zero, in order to be skipped during comparison. This allows, for example, to use fuzzy fingerprints on file formats or file layouts that would otherwise not permit its application. One such example would be the creation of fuzzy executable fingerprints for UPX-packed executables by limiting the covered blocks to those belonging to its resource section. The portion of file 410 has been divided into a plurality of blocks 412. The size of any one particular block within the plurality of block 412 is not limited to any particular size. In various embodiments, the size of any particular block within the plurality of blocks 412 is determined by the location of the block within the file. In most embodiments, one or more of the plurality of blocks 412 are in a different location, and maybe different part of the portion, of file 410 as one or more other blocks in the plurality of blocks 412, and may be given a different size according to these different location within the portion of the file 410. Therefore, different blocks or groups of blocks within the plurality of blocks 12 may have different block sizes.

In various embodiments, block size depends on the file's size. In various embodiments, smaller block sizes are used for small files, and larger block sizes are used for large files. In various embodiments, the block size may also change dynamically throughout the portion 410, according to its location in the file. In various embodiments, smaller block sizes are used in portion 410 at the more important code section, while larger block sizes are used in portion 410 for areas that include only data and resource sections of file 402.

In various embodiments a weighting is determined for each of the plurality of blocks 412 within the portion 410. Weighting for any given block within the plurality of blocks 412 is not limited to any particular value. In various embodiments, the weighting depends on a particular block's location within file 402, that is, it depends on how important data at that location is for the given file format, and/or how indicative data at that location is for a file to be, or include, malware.

In various embodiments, appropriate input files for having a fuzzy executable fingerprint generated for the file are dissected into blocks, with each block's size and weighting depending on its location in the file. The block's information entropy is used as being indicative for its complexity.

In various embodiments, for a complexity value 429 is determined for each of the plurality of blocks 412. In various embodiments, each block's information entropy is used to determine a complexity value 429 for a given block. In various embodiments, each blocks information entropy is calculated as:

$$H(X) = -\sum_{i=1}^{n} p(x_i)\log_2 p(x_i)$$

where
H(X) is based on the information content or self-information of X, which is itself an arbitrary variable; and
$p(x_i)=Pr(X=x_i)$ is the probability mass function of X.
and is calculated with x={0 . . . 255}, $x_i$=i−1 and n=|x| In various embodiments, the data block is a set of 8-bit values. However, blocks are not limited to any particular word size used for calculating their complexity approximations, such as bytes, 16-bit or 32-bit words, and may use different word sizes per block in different part of the file.

By calculating a complexity value for each of the plurality of blocks 412, a fuzzy executable fingerprint is created for file 402. The fuzzy executable fingerprint is considered to be fuzzy because it is not an exact representation of file 402. A "fingerprint" of a file is expected to be unique, e.g. no two different files should produce the same fingerprint—like, for example, the file's MD5 checksum. Such fingerprints are perfectly suited to exactly detect the same file again, but they are explicitly designed to be not ambiguous for different files—e.g. they are not applicable to detect slight variants of the fingerprinted file. Of course, detection signatures are a well-known solution to detection of malware, but in contrast to fingerprints, malware has to be analyzed manually and the signature has to be created manually, which all is more expensive (especially due to the tremendous load of new incoming malware variants) than the automatic creation of fingerprints.

The advantage of the fuzzy executable fingerprint is that if the fuzzy executable fingerprint is made for a file, for instance file 402, that is a known malware file, the fuzzy executable finger print for file 402 is useable to detect variants of the malware, represented by or included in file 402, wherein the variant of the file 402 is not exactly the same as file 402, and so would not be detected by a fingerprint comparison, but can be detected as a variant malware file by comparing a fuzzy executable fingerprint of file 402 to a fuzzy executable fingerprint of a suspected file.

Figure 5:
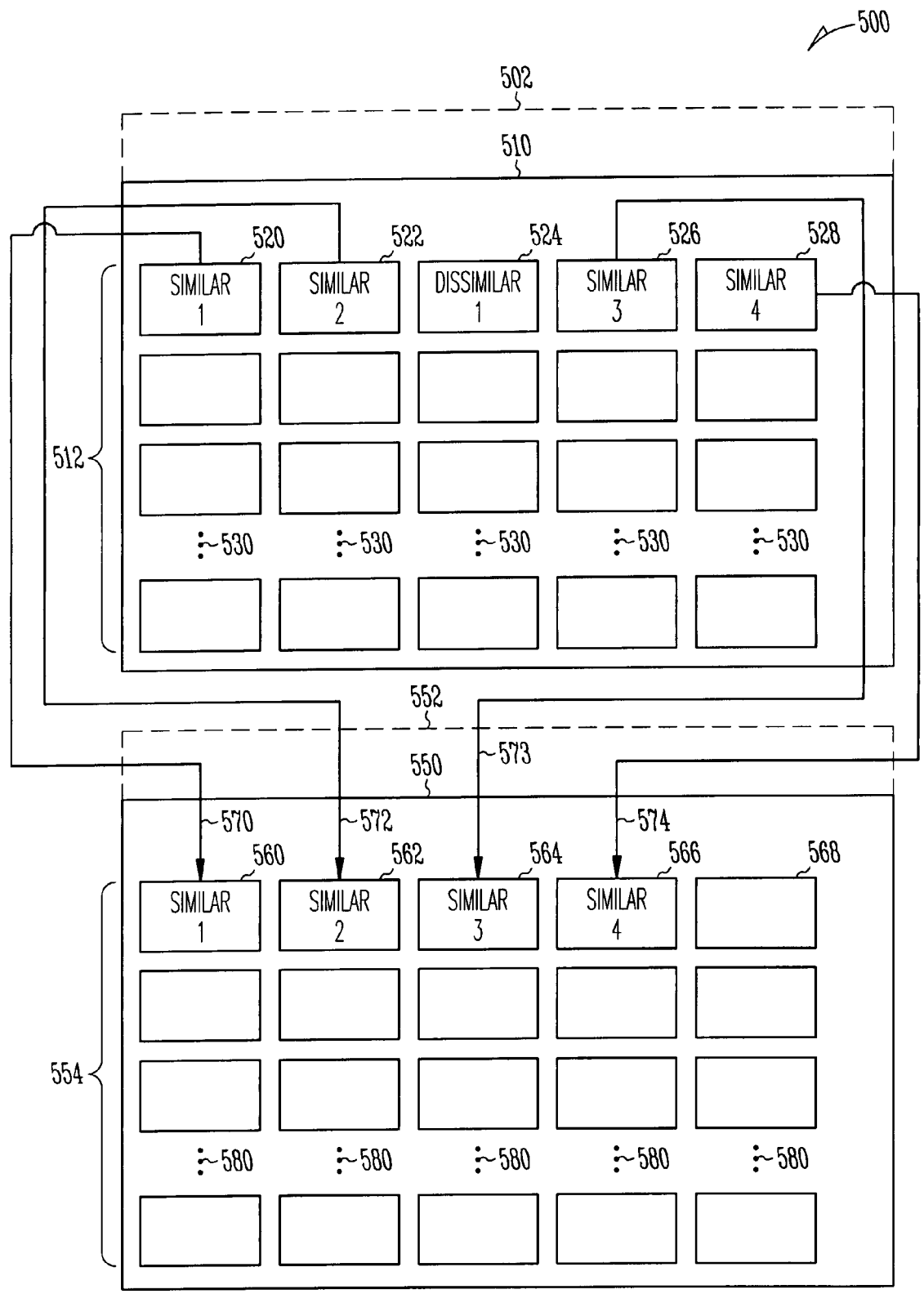
FIG. 5 illustrates a diagram including a comparison of two fuzzy executable fingerprints from two different files.

FIG. 5 illustrates a diagram 500 including a comparison of two fuzzy executable fingerprints from two different files. Diagram 500 includes a first file 510 and a second file 550. In various embodiments, file 510 is a portion of a file 502, and file 550 is a portion of file 552.

In various embodiments, first file 510 includes a plurality of blocks 512, including blocks 520, 522, 224, 526, and 528 in the first row of the plurality of blocks 512. The number of rows of blocks in the plurality of blocks 512 is not limited to a particular number of rows, and indicated by dotted lines 530. The size of the blocks in the plurality of blocks is not limited to any particular size and may be any size as described herein. In various embodiments, first file 510 is a file known to be malware, and for which a fuzzy executable fingerprint, including a complexity value and a weighting for each of the blocks within the plurality of blocks 512 has been generated.

In various embodiments, second file 550 includes a plurality of blocks 554, including blocks 560, 562, 264, 566, and 568 in the first row of the plurality of blocks 554. The number of rows of blocks in the plurality of blocks 512 is not limited to a particular number of rows, and indicated by dotted lines 580. However, a number of rows included in second file 550 will be used that corresponds to the number of row used in first file 510 in order to provide a nearly corresponding number of blocks on which to make a comparison between the first file 510 and the second file 550.

In various embodiments, the size of each block in second file 550 will be made to be of same size as a corresponding block in first file 510. By way of illustration, the size of block 560 in second file 550 will be the same size as block 520 in first file 510, the size of block 562 in second file 550 will be the same size as block 522 in first file 510, the size of block 564 in second file 550 will be the same size as block 524 in first file 510, the size of block 566 in second file 550 will be the same size as block 520 in first file 510, and the size of block 568 in second file 550 will be the same as the size of block 528 in first file 510.

In various embodiments, it is not required that the number of blocks in second file 550 be exactly the same as the number of blocks in first file 510. A difference of one or more blocks based for example on the number of blocks in a particular portion of the first file 510 and a corresponding portion of the second file 550 may not result in the exact same number of blocks in the two files, but will nevertheless not prevent the comparison between the two files from being performed.

A fuzzy executable fingerprint is generated for each of first file 510 and second file 550. The fuzzy executable fingerprint for first file 510 includes a complexity value and a weighting for each of the plurality of blocks 512 in first file 510. In various embodiments, the fuzzy executable fingerprint for first file 510 includes meta information about first file 510, including but not limited to a file size and a media type for first file 510. The fuzzy executable fingerprint for second file 550 includes a complexity value and a weighting for each of the plurality of blocks 554 in second file 550. In various embodiments, the fuzzy executable fingerprint for second file 550 includes meta information about second file 550, including but not limited to a file size and a media type for second file 550.

Using the fuzzy executable fingerprints for first file 510 and second file 550, a block-wise comparison of the fuzzy executable fingerprints from the first file 510, known to be malware, is made to the fuzzy executable fingerprint of second file 550. In various embodiments, a block-wise comparison begins at a particular block in first file 510 and at a particular block in second file 550.

In various embodiments, the fingerprint from first file 510 used in the comparison includes a magic bytes sequence that must exist at the same given offset in second file 550. In various embodiments, the magic bytes sequence includes wildcards. In various embodiments, the magic bytes sequence from first file 510 is at or near the start of file 510.

In various embodiments a block-wise comparison includes comparing a block from first file 510 at a given file offset to a block in second file 550 at the same file offset in second file 550. In various embodiments, the similarity or dissimilarity between the complexity values of the compared blocks is determined. For example, the complexity value of the first block from the first file 510 is compared to the complexity value for the compared block from the second file 550. In various embodiments, if the percentage different in the complexity value is within plus or minus a pre-determined threshold value N, such as a threshold percentage, then the compared blocks are said to be similar. On the other hand, if the percentage difference in the complexity value is more than plus or minus the predetermined threshold value N, the compared blocks are said to be dissimilar.

By way of illustration, block 520 in first file 510 is being compared to block 560 is second file 550 using a threshold value of 90 percent. If the complexity value for block 520 is 3.5, and the complexity value for block 560 is 3.7, the compared percent value of 3.5 divided by 3.7 is approximately 0.95, or 95 percent. Using a threshold value of 90 percent, this compared percentage of 95 percent is greater than the pre-determined threshold value of 90 percent. Because the calculated compared percentage value for the compared blocks exceeds the threshold value, the compared blocks would be deemed to be "similar."

If the complexity value of block 524 is 3.5, and the complexity value of compared block 564 is 4.0, the compared percent value of 3.5 divided by 4.0 is approximately 0.87, or 87 percent. Again using a threshold value of 90 percent, this compared percentage of 87 percent is less then the pre-determined threshold value of 90 percent. Because the calculated compared percentage value for the compared bocks is less than the threshold value, the compared blocks would be deemed to be "dissimilar."

As illustrated in FIG. 5, block 520 in first file 510 is compared to block 560 in second file 550, and is determined to be similar, as indicated by the "SIMILAR 1" designation included in each of these blocks. As also shown, block 522 in first file 510 is compared to block 562 in second file 550, and is determined to be similar, as indicated by the "SIMILAR 2" designation included in each of these blocks. However, when block 524 in first file 510 is compared to block 564 in second file 550, the blocks are determined to be dissimilar, and indicated by the "DISSIMILAR 1" indication in block 524.

In various embodiments, a block-wise comparison between files in not limited to a comparison of blocks at the exact same offsets in the files being compared. In various embodiments, a block wise comparison between files includes comparing a block in a first file with one or more block located near the corresponding block having the same offset in the second file. Continuing with the example from FIG. 5, although block 524 in first file 510 was determined to be dissimilar from block 564 in second file 550, a comparison of block 526, the next block in first file 510, with block 564 from second file 550 resulted in a determination that these blocks are similar. This is represented by arrow 573 and the "SIMILAR 3" indication included in blocks 526 and 564.

Continuing on with the comparison, block 528 from first file 510 is compared to block 566 of second file 550, as represented by arrow 574. As shown, using the comparison, blocks 528 and 566 are determined to be similar, as illustrated by the "SIMILAR 4" indication in blocks 528 and 566. Thus, a block-wise comparison includes comparing blocks from the first file 510 to blocks from second file 550 wherein blocks from the second file are not necessarily at the same offset or at a same position within the blocks as the block used in the comparison from first file 510.

Variations in the comparison patterns is not limited to any particular comparison pattern or any particular variations of comparison patterns between the blocks in the first file and the blocks in the second file. Variations in the block-wise patterns include any number of variation or schemes that are determined to be appropriate for detection of malware in compared files.

A block-wise comparison is performed by calculating a similarity value for the two compared data blocks. In various embodiments, for any two blocks the similarity probability of the blocks is calculated as the actual deviation of both blocks complexity value in relation to a maximum possible deviation, times a proximity factor for the comparison between offset i in a first file $x_1$ and offset j in a second file $x_2$, wherein:

$$d_{max} = 2 \cdot N\% \cdot \max(H(b(x_1, i)), H(b(x_2, j)))$$

and $$s(x_1, i, x_2, j) = \frac{d_{max} - |H(b(x_1, i)) - H(b(x_2, j))|}{d_{max}} \cdot \frac{\max(|x_1|, |x_2|) - |i - j|}{\max(|x_1|, |x_2|)}$$

In various embodiments, the similarity probability is multiplied by the two blocks' weighting. In various embodiments, the weighting would be 1 by default, and would drop below 1 for less important blocks, and rise above 1 for important blocks. By way of illustration, the blocks for a code section of a file would have a weighting of 1.2.

In most embodiments, the similarity probability also takes into account a distance that is the difference between both blocks' file offset, referred to as a proximity factor above.

The individual similarity probabilities are summed up using Bayes' formula to generate an overall similarity probability. Bayes' formula relates the conditional and marginal probabilities of stochastic events A and B:

$$Pr(A|B) = \frac{Pr(B|A)Pr(A)}{Pr(B)} \propto L(A|B)Pr(A)$$

where L(A|B) is the likelihood of A given fixed B. Notice the relationship:

$$Pr(B|A) = L(A|B).$$

Each term in Bayes' formula has a conventional name:
  Pr(A) is the prior probability or marginal probability of A. It is "prior" in the sense that it does not take into account any information about B.
  Pr(A|B) is the conditional probability of A, given B. It is also called the posterior probability because it is derived from or depends upon the specified value of B.
  Pr(B|A) is the conditional probability of B given A.
  Pr(B) is the prior or marginal probability of B, and acts as a normalizing constant.

The overall similarity probability provides a percentage probability that a second file is a variant of a first file. In various embodiments, a user may compare the overall similarity probability to a threshold value M to determine if the second file is to be considered malware. For example, if an overall similarity probability for a second file equals or exceeds a threshold value M, the second file may be determined to be a variant of the first file. If the first file is known malware, the second file may then be determined to be malware based on the overall similarity probability and the threshold value M. On the other hand, if an overall similarity probability for a second file as compared to a first file does not exceed the threshold value M, a determination is made that the second file is not a variant to the first file.

In some embodiments, a second threshold X may be used, with X<M, such that files with a similarity probability less than X are deemed to be not a malware variant, files with probability greater than M deemed a malware variant, and those between X and M deemed suspicious and users be warned.

A pattern as shown in FIG. 5 could be representative of inserted code at block 524, which may be code inserted as malware. In addition block 524 may have been removed from file 550 in an attempt to hide file 550 from detection as malware in instances where the code 524 is known to be malware and is used to screen programs used to detect malware. By removing or changing the code in block 524, a malware author may have attempted to defeat detection of a variant of the malware now present in file 550. A different technique relying on an exact fingerprint for compared files, such as a checksum detection technique, would not detect this second file as a same a malware file the first and known malware file, and this may fail provide an indication that the second file is a minor variant of the first and known malware file. By using a fuzzy executable fingerprint, and by using one or more variations of the block-wise comparisons, a variant of a known file including malware is detectable.

Figure 6:
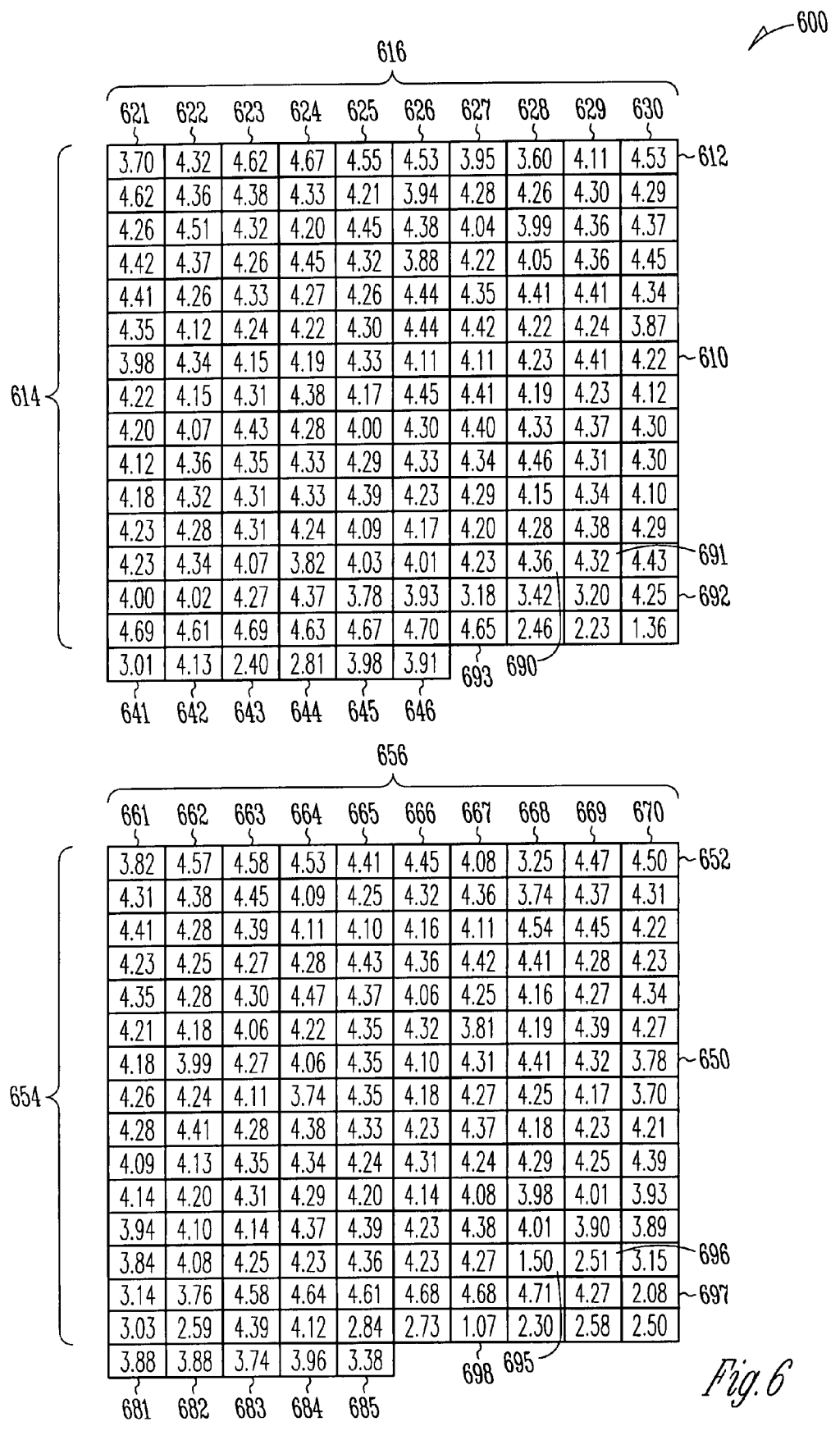

FIG. 6 illustrates a diagram including a representation of a first file 610 and a representation of a second file 650. First file 610 is shown having a plurality of blocks including in rows 614 and columns 616. Second file 650 is shown having a plurality of block included in rows 654 and columns 656. First file 610 and second file 650 have a similar structure of blocks, wherein first file 610 has ten columns of blocks, and second file 650 has ten columns of blocks. First file 610 has fifteen complete rows of blocks, including blocks 621-630 in the upper most row, and an incomplete sixteenth row including six blocks 641-646. Second file 650 has fifteen complete rows of blocks, including blocks 661-670 in the upper most row, and an incomplete sixteenth row including five blocks 681-655. As shown in FIG. 6, second file 650 has one less block than first file 610.

Each block in first file 610 has a complexity value 612 associated with the block and representative of a calculated complexity value for the given block. Each block in second file 650 has a complexity value 652 associated with the block and representative of a calculated complexity value for the given block. These complexity values may be used to compare first file 610, which is considered to be illustrative of known malware, to second file 650. As illustrated in FIG. 6, in many instances the complexity value for a block in first file 610 is near in value to a complexity value for a corresponding block in a same, or nearby, position of second file 650. By way of illustration, block 621 in first file 610 has a complexity value of 3.70, wherein block 661 in second file 650 has a complexity value of 3.82. Depending on the setting used for the threshold value, blocks 621 and 661 could be determined to be similar blocks.

A same result, again depending on the threshold value used in the comparison, may be obtained when comparing blocks 622-630 in the upper most row of first file 610 to blocks 662-670 in the upper most row of second file 650. In contrast, block 690 in first file 610 has a complexity value of 4.36, wherein the correspond block 695 in second file 650 has a complexity value of 1.50. This discrepancy in values may represent dissimilar block, and may indicate an amendment, an insertion, or a deletion of program code in the second file 650 as compared to first file 610. In other possible comparisons, blocks 691, 692 and 693 in first file 610 have complexity values of 4.32, 4.25, and 4.65 respectively, wherein the corresponding blocks 696, 697, and 698 have complexity values of 2.51, 2.08, and 1.07 respectively. Again depending on the threshold value being used, these sets of corresponding blocks ought to be determined to be dissimilar.

After calculating a similarity probability as a result of a fuzzy executable fingerprint comparison between these files, an overall similarity probability may be calculated. By comparing the generated overall similarity probability with the threshold value for M, a determination can be made as to whether second file 650 is a variant of a known malware file represented by file 610.

The generation of the fuzzy executable fingerprints does not require any manual analysis, and does not require any detection rule signature creation in order to detect new variants of known malware. In addition, the use of fuzzy executable fingerprints generates fewer false-positives than other non-exact methods, such as heuristic detection methods.

In various embodiments, if certain parameters are met during a comparison process using fuzzy executable fingerprints, the entire blocks of the file do not need to be compared in order to determine that a file being compared to a known malware file's fingerprint is not a variant of the known malware file.

FIG. 7 illustrates diagram 700 including a representation of a file 710. File 710 is shown having a plurality of blocks including in rows 714 and columns 716. File 710 has a similar structure of blocks to first file 610 in FIG. 6, wherein file 710 has ten columns of blocks, and first file 610 has ten columns of blocks. File 710 has fifteen complete rows of blocks, including blocks 721-730 in the upper most row, and an incomplete sixteenth row including three blocks 741-743. First file 610 has fifteen complete rows of blocks, including blocks 621-630 in the upper most row, and an incomplete sixteenth row including six blocks 641-646.

As shown in FIG. 7, each of the blocks in file 710 h as a complexity value 712. In file 710, blocks 723-730 all include a complexity value of 0.00. The corresponding blocks in first file 610, including blocks 623 through 630, corresponding at least in position in the file to blocks 723-730, include complexity values of 4.62, 4.67, 4.55, 4.53, 3.95, 3.60, 4.11, and 4.53 respectively. In comparing the complexity values of blocks 723-730 with blocks 623-630, a determination of "dissimilar" resulting from each of these comparisons would result in eight comparisons in a row being dissimilar.

In various embodiments, a threshold value Z could be used to determine if a partial number of comparisons having a result of "dissimilar" had occurred in a row during any given comparison of fuzzy executable fingerprints between two files. If the number of comparisons having a result of dissimilar in a row occurs that equals or exceed threshold value Z, the comparison process could be ended, and a determination that the tested file, such as file 710, is not a variant of the file known to be malware, such as file 610, could be made.

This terminated comparison based on the number of dissimilar comparisons found in a row would reduce the time used to make a comparison, while still making a determination that the file being tested is not a variant of a given file known to be malware. The saved time could be used to compare the file being tested to other fuzzy executable fingerprints of known malware files, and thus reduce the time required to test a file against a set of fingerprints of files known to be malware. As the number of files known to be malware increases, the saved time becomes more important in being able to process incoming files to be tested in a expedient manner.

Figure 8:
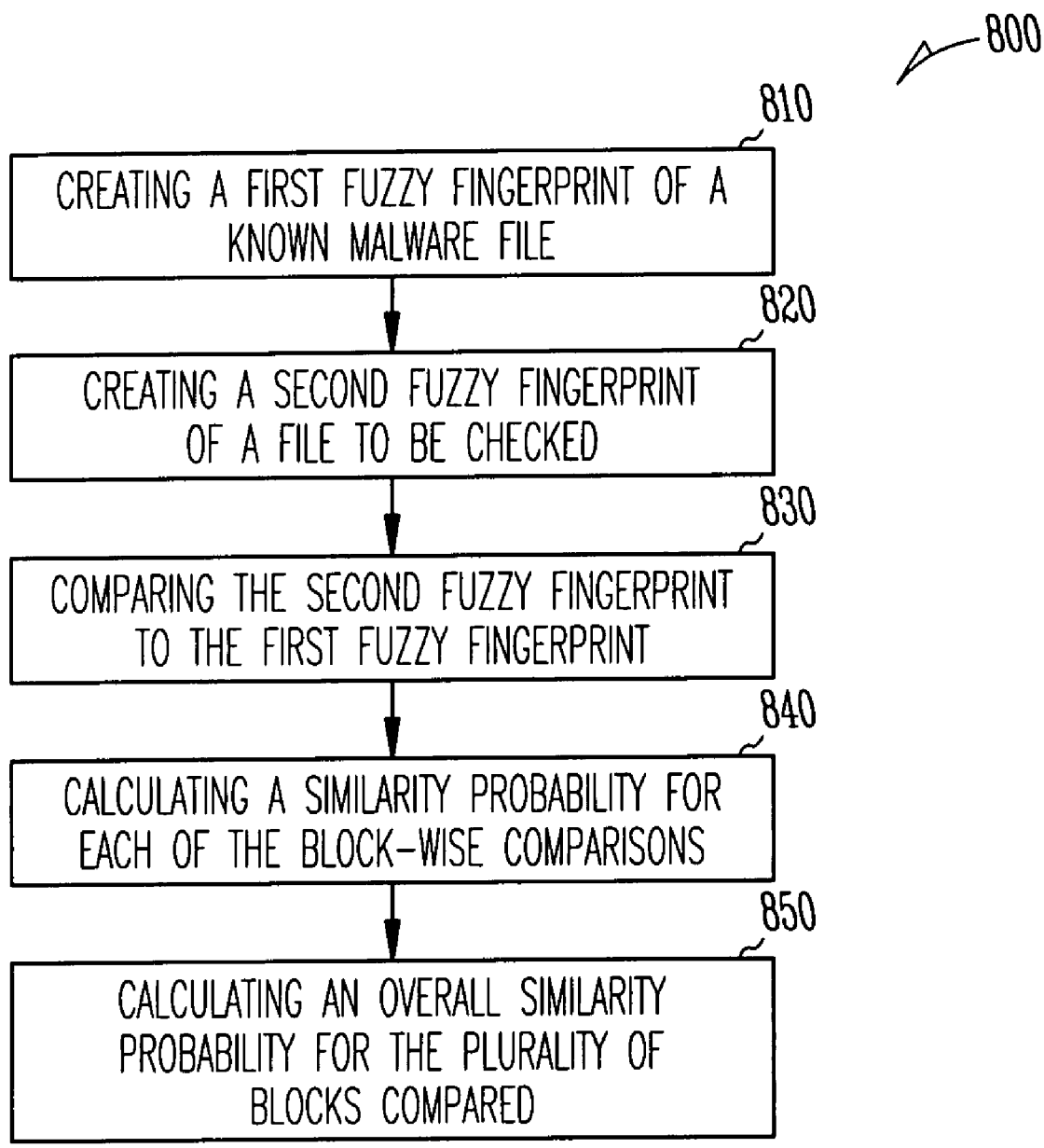
FIG. 8 illustrates a flow chart for a method according to various embodiments.

FIG. 8 illustrates a flowchart for a method 800 according to various embodiments.

At block 810, method 800 includes creating a first fuzzy fingerprint of a known malware file. In various embodiments, block 810 includes the first fuzzy fingerprint including a first set of calculated complexity approximations and weightings for each of a plurality of blocks within the known malware file;

At block 820, method 800 includes creating a second fuzzy fingerprint of a file to be checked. In various embodiments, block 820 includes the second fuzzy fingerprint including a second set of calculated complexity approximations and weightings for each of a plurality of blocks within the file to be checked;

At block 830 method 800 includes comparing the second fuzzy fingerprint to the first fuzzy fingerprint. In various embodiments, block 830 includes comparing the calculated complexity approximations from the second fuzzy fingerprint with a plurality of the complexity approximations from the first fuzzy fingerprint using a block-wise comparison; and At block 840 method 800 includes calculating an similarity probability for each of the block-wise comparisons. In various embodiments, block 840 includes the calculation including a respective weightings for each of the plurality of blocks within the known malware file and for each of the plurality of block within the file to be checked, and the calculation including a distance between the compared blocks; and At block 850 method 800 includes calculating an overall similarity probability for the plurality of blocks compared.

Various embodiments of method 800 include stopping the block-wise comparisons if a threshold number of block-wise comparisons in a row each dropped below a threshold value N for the calculated similarity probability.

Various embodiments of method 800 include calculating a complexity approximation for each of a plurality of blocks with the known malware file and calculating a complexity approximating for each of the plurality of blocks within the file to be checked includes calculating the information entropy for a given block using the formula:

$$H(X) = -\sum_{i=1}^{n} p(x_i) \log_2 p(x_i)$$

where

H(X) is based on the information content or self-information of X, which is itself an arbitrary variable;

$p(x_i)=Pr(X=x_i)$ is the probability mass function of X; and and is calculated with $x=\{0 \ldots 255\}$, $x_i=i-1$ and $n=|x|$.

Various embodiments of method 800 include wherein calculating a similarity value for each of the block-wise comparisons includes for any given two blocks being compared, calculating an actual deviation of both blocks complexity value in relation to a maximum possible deviation, times a proximity factor for the comparison between an offset i in a first file $x_1$ and an offset j in a second file $x_2$, wherein:

$$d_{max} = 2 \cdot N\% \cdot \max(H(b(x_1, i)), H(b(x_2, j)))$$

and $$s(x_1, i, x_2, j) = \frac{d_{max} - |H(b(x_1, i)) - H(b(x_2, j))|}{d_{max}} \cdot \frac{\max(|x_1|, |x_2|) - |i - j|}{\max(|x_1|, |x_2|)}.$$

Various embodiments of method 800 include summing up using Bayes' formula to generate an overall similarity probability, wherein Bayes' formula relates the conditional and marginal probabilities of stochastic events A and B:

$$Pr(A|B) = \frac{Pr(B|A)Pr(A)}{Pr(B)} \propto L(A|B)Pr(A)$$

where L(A|B) is the likelihood of A given fixed B.

Various embodiments of method 800 include wherein calculating the overall similarity probability for the plurality of blocks compared includes comparing the overall similarity probability to a threshold value M to determine if the second file is to be considered malware.

Various embodiments of method 800 include determining that the file to be checked is a variant of the known malware file when the calculated overall similarity probability equals or exceeds the threshold value M.

Various embodiments of method 800 include wherein calculating the overall similarity probability for the plurality of blocks compared includes comparing the overall similarity probability to a threshold value X and a threshold value M to determine if the second file is to be considered malware or is to be considered a suspicious file, wherein the threshold value M is greater than the threshold value X.

Various embodiments of method 800 include wherein when the calculated overall similarity probability is less than the threshold value X the file to be checked is determined not to be a variant of the known malware file, and when the calculated overall similarity probability is greater than threshold value M the file to be checked is determined to be a variant of the known malware file, and the file to be checked is considered a suspicious file when the calculated overall similarity probability is greater than the threshold value X but less than or equal to the threshold value for M.

Figure 9:
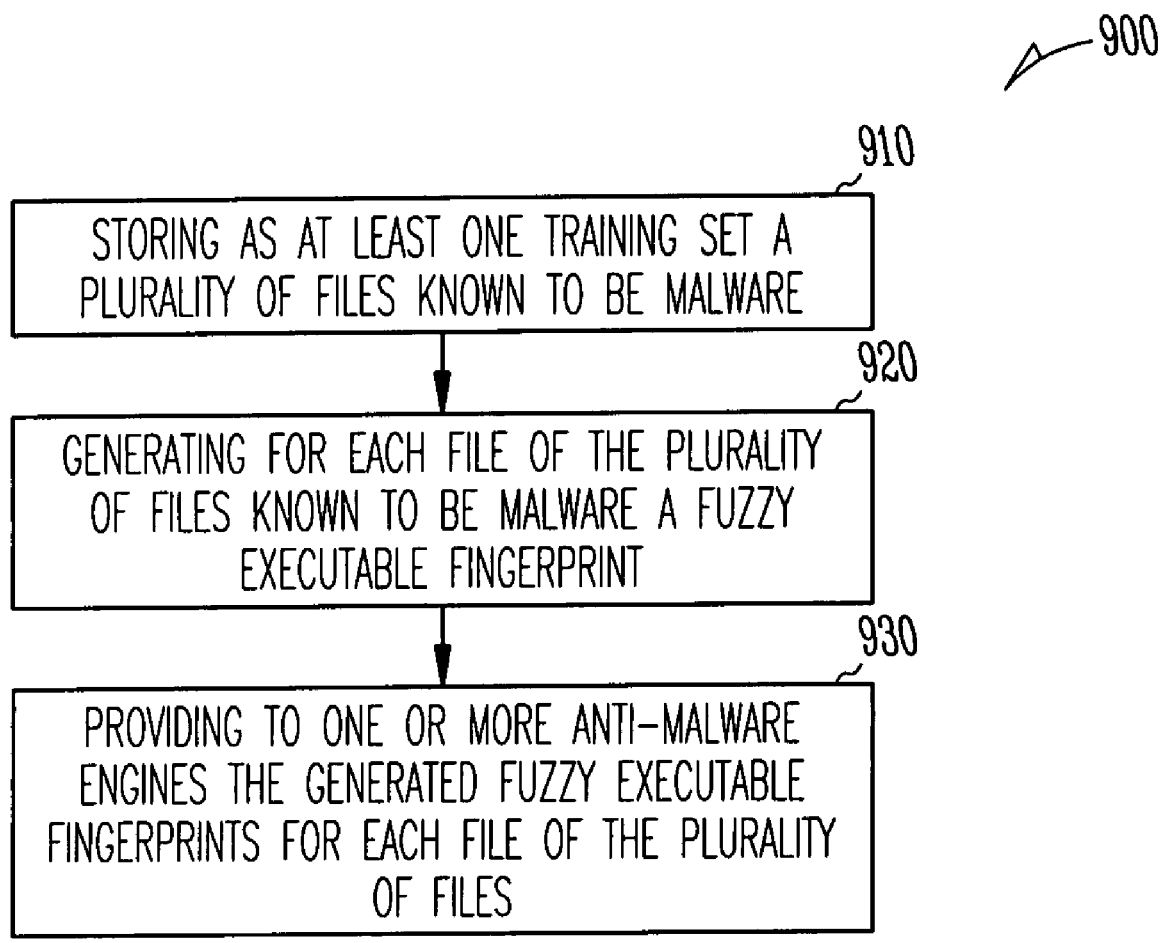
FIG. 9 illustrates a flow chart for a method according to various embodiments.

FIG. 9 illustrates a flowchart for a method 900 according to various embodiments.

At block 910 method 900 includes storing as at least one training set a plurality of files known to be malware;

At block 920 method 900 includes generating for each file of the plurality of files known to be malware a fuzzy executable fingerprint. In various embodiments, block 920 includes each fuzzy executable fingerprint including a first set of calculated complexity approximations and weightings for each of a plurality of blocks within each individual ones of the plurality of files known to be malware; and At block 930 method 900 includes providing to one or more anti-malware engines the generated fuzzy executable fingerprints for each file of the plurality of files.

Various embodiments of method 900 include receiving from any one of the at least one anti-malware engines a detected variant of a one of the files known to be malware, and updating the at least one training set to include the detected variant of the one of the files known to be malware.

Various embodiments of method 900 include generating a fuzzy executable fingerprint for the detected variant of the one of the files known to be malware and updating each of the one or more anti-malware engines to include the generated fuzzy executable fingerprint for the detected variant of the one of the files known to be malware.

Various embodiments of method 900 include wherein providing to one or more anti-malware engines the generated fuzzy executable fingerprint includes a vendor for the anti-malware software providing an updated version of the generated fuzzy executable fingerprints database.

Various embodiments of systems, apparatus, and methods of for detection of malware have been described herein.

Various embodiments include an apparatus comprising a gateway including an anti-malware engine coupled to a generated fuzzy fingerprints database including plurality of fingerprints for known malware files, a fuzzy fingerprint generator coupled to the anti-malware engine, the fuzzy fingerprint generator operable to produce a fuzzy fingerprint including a complexity approximation for each of a plurality of blocks for a file provided by the anti-malware engine, and a fingerprint comparator coupled to the anti-malware engine, the fingerprint comparator operable to compare a produced fingerprint from the fingerprint generator with any one of the plurality fingerprints for the generated fuzzy fingerprints database and to produce a similarity probability on a block-wise basis.

Various embodiments include a system comprising a plurality of protected devices coupled to a network through a gateway, the gateway including an anti-malware engine, a generated fuzzy fingerprint database coupled to the anti-malware engine, the generated fingerprint database including plurality of fingerprints for known malware files coupled to the anti-malware engine, a fuzzy fingerprint generator coupled to the anti-malware engine, the fuzzy fingerprint generator operable to produce a fuzzy executable fingerprint including a complexity approximation for each of a plurality of blocks in a file provided by the anti-malware engine, and a fuzzy fingerprint comparator coupled to the anti-malware engine, the fuzzy fingerprint comparator operable to compare a produced fuzzy executable fingerprint from the fingerprint generator with any one of the plurality of fingerprints from the generated fingerprint database and to produce a similarity probability on a block-by-block basis.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method comprising:
creating a first fuzzy fingerprint of a known malware file, the first fuzzy fingerprint including a first set of calculated complexity approximations and weightings for each of a plurality of blocks within the known malware file;
creating a second fuzzy fingerprint of a file to be checked, the second fuzzy fingerprint including a second set of calculated complexity approximations and weightings for each of a plurality of blocks within the file to be checked;
comparing the second fuzzy fingerprint to the first fuzzy fingerprint via a computerized system, the comparing including comparing the calculated complexity approximations from the second fuzzy fingerprint with a plurality of the complexity approximations from the first fuzzy fingerprint using a plurality of block-wise comparisons of the plurality of blocks within the known malware file and the plurality of blocks within the file to be checked; and
calculating a similarity probability for each of the block-wise comparisons, the calculation including a respective weighting for each of the plurality of blocks within the known malware file and for each of the plurality of blocks within the file to be checked, and the calculation including an actual deviation of both blocks complexity approximation in relation to a maximum possible deviation, times a proximity factor for the comparison between an offset i in a first file $x_1$ and an offset j in a second file $x_2$; and
calculating an overall similarity probability for the plurality of blocks compared, the overall similarity probability therefore comprising a similarity probability between the known malware file and the file to be checked.

2. The method of claim 1, including stopping the block-wise comparisons if a threshold number of block-wise comparisons in a row each dropped below a threshold value N for the calculated similarity probability.

3. The method of claim 1, calculating a complexity approximation for each of a plurality of blocks within the known malware file and calculating a complexity approximation for each of the plurality of blocks within the file to be checked includes calculating the information entropy for a given block using the formula:

$$H(X) = -\sum_{i=1}^{n} p(x_i)\log_2 p(x_i)$$

where
H(X) is based on the information content or self-information of X, which is itself an arbitrary variable;
$p(x_i)=Pr(X=x_i)$ is the probability mass function of X; and is calculated with x={0..255}, $x_i$=i−1 and n=|x|.

4. The method of claim 1, including summing up using Bayes' formula to generate the overall similarity probability, wherein Bayes' formula relates the conditional and marginal probabilities of stochastic events A and B:

$$Pr(A|B) = \frac{Pr(B|A)Pr(A)}{Pr(B)} \propto L(A|B)Pr(A)$$

where L(A|B) is the likelihood of A given fixed B.

5. The method of claim 1, wherein calculating the overall similarity probability for the plurality of blocks compared includes comparing the overall similarity probability to a threshold value M to determine if the second file is to be considered malware.

6. The method of claim 5, including determining that the file to be checked is a variant of the known malware file when the calculated overall similarity probability equals or exceeds the threshold value M.

7. The method of claim 1, wherein calculating the overall similarity probability for the plurality of blocks compared includes comparing the overall similarity probability to a threshold value X and a threshold value M to determine if the second file is to be considered malware or is to be considered a suspicious file, wherein the threshold value M is greater than the threshold value X.

8. The method of claim 7, wherein when the calculated overall similarity probability is less than the threshold value X the file to be checked is determined not to be a variant of the known malware file, and when the calculated overall similarity probability is greater than threshold value M the file to be checked is determined to be a variant of the known malware file, and the file to be checked is considered a suspicious file when the calculated overall similarity probability is greater than the threshold value X but less than or equal to the threshold value for M.

9. An apparatus comprising:
a gateway including an anti-malware engine coupled to a generated fuzzy fingerprints database including plurality of fuzzy fingerprints for known malware files, each fuzzy fingerprint for a known malware file including a first set of calculated complexity approximations and weightings for each of a plurality of blocks within the known malware file;
a fuzzy fingerprint generator coupled to the anti-malware engine, the fuzzy fingerprint generator operable to produce a fuzzy fingerprint including a complexity approximation for each of a plurality of blocks for a file to be checked provided by the anti-malware engine; and
a fingerprint comparator coupled to the anti-malware engine, the fingerprint comparator operable to compare a produced fingerprint from the fuzzy fingerprint generator with any one of the plurality of fuzzy fingerprints from the generated fuzzy fingerprints database by calculating a similarity probability for each of the block-wise comparisons, the calculation including respective weighting for each of the plurality of blocks within the known malware file and for each of the plurality of blocks within the file to be checked and the calculation including an actual deviation of both blocks complexity approximation in relation to a maximum possible deviation, times a proximity factor for the comparison between an offset i in a first file $x_i$ and an offset j in a second file $x_2$, thereby producing a similarity probability between the known malware file and the file to be checked.

10. The apparatus of claim 9, producing a complexity approximation for each of a plurality of blocks includes calculating the information entropy for a given block using the formula:

$$H(X) = -\sum_{i=1}^{n} p(x_i) \log_2 p(x_i)$$

where
H(X) is based on the information content or self-information of X which is itself an arbitrary variable;
$p(x_i)=Pr(X=x_i)$ is the probability mass function of X; and is calculated with x={0..255}, $x_i$=i−1 and n=|x|.

11. The apparatus of claim 9, including summing up using Bayes' formula to generate an overall similarity probability, wherein Bayes' formula relates the conditional and marginal probabilities of stochastic events A and B:

$$Pr(A|B) = \frac{Pr(B|A)Pr(A)}{Pr(B)} \propto L(A|B)Pr(A)$$

where L(A|B) is the likelihood of A given fixed B.

12. The apparatus of claim 9, including an update mechanism operable to receive updated versions of generated fuzzy fingerprints for storage in the generated fuzzy fingerprints database.

13. The apparatus of claim 9, wherein the generated fuzzy fingerprints database includes a precondition table that contains magic bytes signatures for all media type covered by the database.

14. The apparatus of claim 9, wherein the generated fuzzy fingerprints database includes a jump table operable to determine a relative offset into the generated fuzzy fingerprints database based on a file size of the file to be checked.

15. A system comprising:
a plurality of protected devices coupled to a network through a gateway, the gateway comprising a computerized system including an anti-malware engine;
a generated fuzzy fingerprint database coupled to the anti-malware engine, the generated fingerprint database including plurality of fingerprints for known malware files coupled to the anti-malware engine, the fingerprint for each known malware file comprising a first set of calculated approximations and weightings for each of a plurality of blocks within the known malware file;
a fuzzy fingerprint generator coupled to the anti-malware engine, the fuzzy fingerprint generator operable to produce a fuzzy executable fingerprint including a complexity approximation for each of a plurality of blocks in a file provided by the anti-malware engine; and
a fuzzy fingerprint comparator coupled to the anti-malware engine, the fuzzy fingerprint comparator operable to compare a produced fuzzy executable fingerprint from the fingerprint generator for the file to be checked with any one of a plurality of fingerprints from the generated fingerprint database by calculating a similarity probability for each of the block-wise comparisons, the calculation including respective weighting for each of the plurality of blocks within the known malware file and for each of the plurality of blocks within the file to be checked, and the calculation including an actual deviation of both blocks complexity approximation in relation to a maximum possible deviation, times a proximity factor for the comparison between an offset i in a first file $x_1$ and an offset i in a second file $x_2$, thereby producing a similarity probability between the known malware file and the file to be checked.

16. The system of claim 15, wherein the generated fuzzy fingerprints database is coupled to an update mechanism, the update mechanism operable to receive an updated version of the generated fuzzy fingerprints database.

17. The system of claim 16, wherein the updated version update is created from a training set of known malware files on a vendor-provided fingerprint generator server.

18. The system of claim 15, wherein the generated fuzzy fingerprints database is coupled to an update mechanism, the update mechanism operable to receive a new version of the fuzzy executable fingerprints for known malware files.

19. The system of claim 18, wherein the new version of fuzzy executable fingerprints for known malware files is an incremental update of a previous version of fuzzy executable fingerprints for known malware files.

20. The system of claim 15, including an update provisioning server coupled to an update mechanism, the update provisioning server operable to couple the update provisioning server to a fuzzy fingerprint generator server.

21. The system of claim 15, including a fuzzy fingerprint generator server operable to store a plurality of known malware files to be used as one or more training sets for generating a fuzzy executable fingerprint for each of a known malware file.

* * * * *